United States Patent
Ge

(10) Patent No.: US 9,751,320 B2
(45) Date of Patent: Sep. 5, 2017

(54) PRINTHEAD WITH SEPARATE ADDRESS GENERATOR FOR INK LEVEL SENSORS

(71) Applicant: Hewlett-Packard Development Company, L.P., Houston, TX (US)

(72) Inventor: Ning Ge, Newark, CA (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 0 days.

(21) Appl. No.: 15/024,339

(22) PCT Filed: Sep. 27, 2013

(86) PCT No.: PCT/US2013/062163
§ 371 (c)(1),
(2) Date: Mar. 23, 2016

(87) PCT Pub. No.: WO2015/047293
PCT Pub. Date: Apr. 2, 2015

(65) Prior Publication Data
US 2016/0243845 A1 Aug. 25, 2016

(51) Int. Cl.
*B41J 2/175* (2006.01)
*B41J 2/045* (2006.01)
*B41J 2/14* (2006.01)
*G01F 23/00* (2006.01)

(52) U.S. Cl.
CPC ......... *B41J 2/17566* (2013.01); *B41J 2/0451* (2013.01); *B41J 2/0458* (2013.01); *B41J 2/04565* (2013.01); *B41J 2/04581* (2013.01); *B41J 2/14153* (2013.01); *G01F 23/0061* (2013.01)

(58) Field of Classification Search
CPC .. B41J 2/17566; B41J 2/0451; B41J 2/04565; B41J 2/0458; B41J 2/14153; B41J 2/04581; G01F 23/0061
See application file for complete search history.

(56) References Cited

U.S. PATENT DOCUMENTS

| | | | | |
|---|---|---|---|---|
| 4,091,671 A | * | 5/1978 | McLees | G01F 23/74 331/65 |
| 5,422,664 A | * | 6/1995 | Stephany | B41J 2/04558 347/14 |
| 6,318,828 B1 | | 11/2001 | Barbour et al. | |

(Continued)

OTHER PUBLICATIONS

International Search Report and Written Opinion for International Application No. PCT/US2013/062163 dated Jun. 16, 2014, 10 pages.

(Continued)

Primary Examiner — Justin Seo
(74) Attorney, Agent, or Firm — HP Inc.—Patent Department

(57) ABSTRACT

A printhead with a separate address generator for ink level sensors is described. In an example, a printhead includes drop ejectors fluidically coupled to nozzles, at least one nozzle address generator, nozzle decoders coupled to nozzle address generator(s) and the drop ejectors, ink level sensors each having a sensor circuit in a sensor chamber and a purging resistor circuit, a sensor address generator, and sensor decoders coupled to the sensor address generator and the purging resistor circuit in each of the ink level sensors.

10 Claims, 6 Drawing Sheets

(56) References Cited

U.S. PATENT DOCUMENTS

| | | | |
|---|---|---|---|
| 6,648,434 | B2 | 11/2003 | Walker et al. |
| 7,210,756 | B2 | 5/2007 | Imai |
| 7,722,144 | B2 | 5/2010 | Benjamin et al. |
| 7,815,273 | B2 | 10/2010 | Bruce et al. |
| 2004/0021711 | A1 | 2/2004 | Hasseler et al. |
| 2005/0088474 | A1 | 4/2005 | Juve et al. |
| 2006/0114277 | A1 | 6/2006 | Corrigan, II |
| 2006/0164446 | A1 | 7/2006 | Beak |
| 2006/0274112 | A1* | 12/2006 | Jackson Pulver .... B41J 2/04505 347/42 |
| 2008/0043051 | A1 | 2/2008 | Benjamin et al. |
| 2012/0025845 | A1* | 2/2012 | Carrobe ................ B41J 2/0451 324/551 |
| 2014/0168312 | A1* | 6/2014 | Mizes ........................ B41J 2/01 347/17 |

OTHER PUBLICATIONS

Liou et al, "Reduced 30% Scanning Time 3D Multiplexer Integrated Circuit Applied to Large Array Format 20KHZ Frequency Inkjet Print Heads" EDA Pub/DTIP 2007, 6 pgs.

* cited by examiner

PRINTHEAD WITH SEPARATE ADDRESS GENERATOR FOR INK LEVEL SENSORS

BACKGROUND

Inkjet technology is widely used for precisely and rapidly dispensing small quantities of fluid. Inkjets eject droplets of fluid out of a nozzle by creating a short pulse of high pressure within a firing chamber. During printing, this ejection process can repeat thousands of times per second. Inkjet printing devices are implemented using semiconductor devices, such as thermal inkjet (TIJ) devices or piezoelectric inkjet (PIJ) devices. For example, a TIJ device is a semiconductor device including a heating element (e.g., resistor) in the firing chamber along with other integrated circuitry. To eject a droplet, an electrical current is passed through the heating element. As the heating element generates heat, a small portion of the fluid within the firing chamber is vaporized. The vapor rapidly expands, forcing a small droplet out of the firing chamber and nozzle. The electrical current is then turned off and the heating element cools. The vapor bubble rapidly collapses, drawing more fluid into the firing chamber.

BRIEF DESCRIPTION OF THE DRAWINGS

Some embodiments of the invention are described with respect to the following figures.

DETAILED DESCRIPTION

Figure 1:
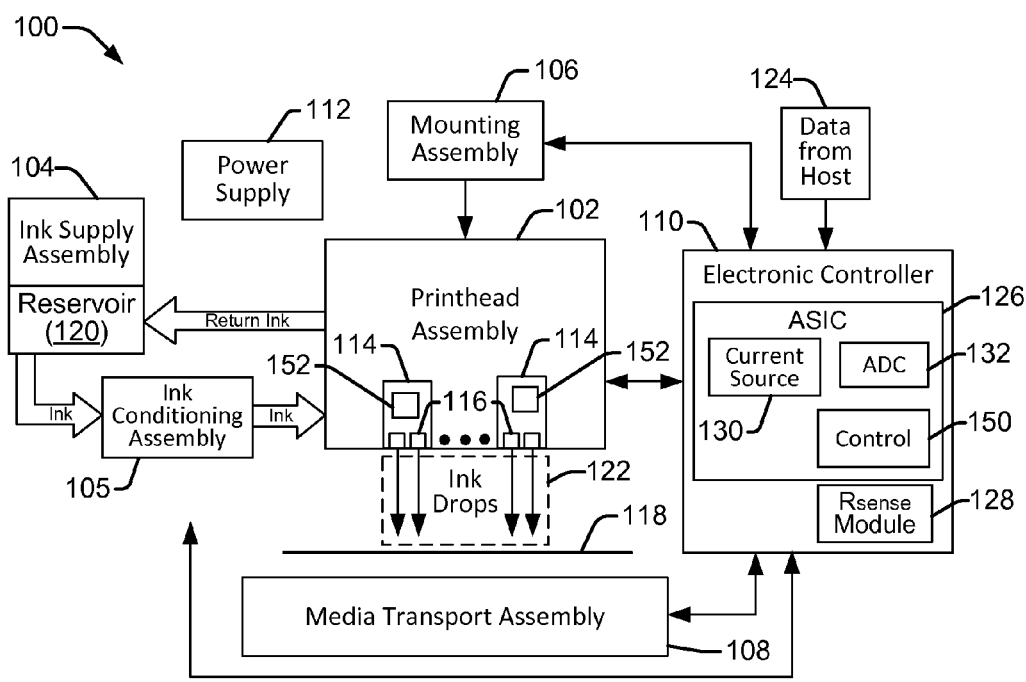
FIG. 1 illustrates a fluid ejection device embodied as an inkjet printing system according to an example implementation.

FIG. 1 illustrates a fluid ejection device embodied as an inkjet printing system 100 according to an example implementation. A fluid ejection assembly is disclosed as a fluid drop jetting printhead 114. Inkjet printing system 100 includes an inkjet printhead assembly 102, an ink supply assembly 104, a mounting assembly 106, a media transport assembly 108, an electronic printer controller 110, and at least one power supply 112 that provides power to the various electrical components of inkjet printing system 100. Inkjet printhead assembly 102 includes at least one fluid ejection assembly 114 (printhead 114) that ejects drops of ink through a plurality of orifices or nozzles 116 toward a print medium 118 so as to print onto print media 118. Control circuits 152 on each printhead 114 selectively enable drop ejectors to eject drops of ink. Print media 118 can be any type of suitable sheet or roll material, such as paper, card stock, transparencies, polyester, plywood, foam board, fabric, canvas, and the like. Nozzles 116 are typically arranged in one or more columns or arrays such that properly sequenced ejection of ink from nozzles 116 causes characters, symbols, and/or other graphics or images to be printed on print media 118 as inkjet printhead assembly 102 and print media 118 are moved relative to each other.

Ink supply assembly 104 supplies fluid ink to printhead assembly 102 and includes a reservoir 120 for storing ink. Ink flows from reservoir 120 to inkjet printhead assembly 102. Ink supply assembly 104 and inkjet printhead assembly 102 can form either a one-way ink delivery system or a recirculating ink delivery system. In a one-way ink delivery system, substantially all of the ink supplied to inkjet printhead assembly 102 is consumed during printing. In a recirculating ink delivery system, however, only a portion of the ink supplied to printhead assembly 102 is consumed during printing. Ink not consumed during printing is returned to ink supply assembly 104.

In one example, ink supply assembly 104 supplies ink under positive pressure through an ink conditioning assembly 105 to inkjet printhead assembly 102 via an interface connection, such as a supply tube. Ink supply assembly 104 includes, for example, a reservoir, pumps and pressure regulators. Conditioning in the ink conditioning assembly 105 may include filtering, pre-heating, pressure surge absorption, and degassing. Ink is drawn under negative pressure from the printhead assembly 102 to the ink supply assembly 104. The pressure difference between the inlet and outlet to the printhead assembly 102 is selected to achieve the correct backpressure at the nozzles 116, and is usually a negative pressure between negative 1" and negative 10" of H2O. Reservoir 120 of ink supply assembly 104 may be removed, replaced, and/or refilled.

Mounting assembly 106 positions inkjet printhead assembly 102 relative to media transport assembly 108, and media transport assembly 108 positions print media 118 relative to inkjet printhead assembly 102. Thus, a print zone 122 is defined adjacent to nozzles 116 in an area between inkjet printhead assembly 102 and print media 118. In one example, inkjet printhead assembly 102 is a scanning type printhead assembly. As such, mounting assembly 106 includes a carriage for moving inkjet printhead assembly 102 relative to media transport assembly 108 to scan print media 118. In another embodiment, inkjet printhead assembly 102 is a non-scanning type printhead assembly. As such, mounting assembly 106 fixes inkjet printhead assembly 102 at a prescribed position relative to media transport assembly 108. Thus, media transport assembly 108 positions print media 118 relative to inkjet printhead assembly 102.

Electronic printer controller 110 typically includes a processor, firmware, software, one or more memory components including volatile and no-volatile memory components, and other printer electronics for communicating with and controlling inkjet printhead assembly 102, mounting assembly 106, and media transport assembly 108. Electronic controller 110 receives data 124 from a host system, such as a computer, and temporarily stores data 124 in a memory. Typically, data 124 is sent to inkjet printing system 100 along an electronic, infrared, optical, or other information transfer path. Data 124 represents, for example, a document and/or file to be printed. As such, data 124 forms a print job for inkjet printing system 100 and includes one or more print job commands and/or command parameters.

In one example, electronic printer controller 110 controls inkjet printhead assembly 102 for ejection of ink drops from nozzles 116. Thus, electronic controller 110 defines a pattern of ejected ink drops that form characters, symbols, and/or other graphics or images on print media 118. The pattern of ejected ink drops is determined by the print job commands and/or command parameters from data 124. In one example, electronic controller 110 includes a printer application specific integrated circuit (ASIC) 126 and a resistance-sense firmware module 128 executable on ASIC 126 or controller 110. Printer ASIC 126 includes a current source 130, an analog to digital converter (ADC) 132, and control circuits 150. ASIC 126 can convert the voltage present at current source 130 to determine a resistance, and then determine a corresponding digital resistance value through the ADC 132. A programmable algorithm implemented by the resistance-sense module 128 enables the resistance determination and the subsequent digital conversion through the ADC 132. The control circuits 150 generate signals for driving the control circuits 152 on the printheads 114.

In the described examples, inkjet printing system 100 is a drop-on-demand thermal inkjet printing system with a thermal inkjet (TIJ) printhead 114 suitable for implementing an ink level sensor as disclosed herein. In one implementation, inkjet printhead assembly 102 includes a single TIJ printhead 114. In another implementation, inkjet printhead assembly 102 includes a wide array of TIJ printheads 114. While the fabrication processes associated with TIJ printheads are well suited to the integration of the ink level sensor, other printhead types such as a piezoelectric printhead can also implement such an ink level sensor. Thus, the disclosed ink level sensor is not limited to implementation in a TIJ printhead 114.

Figure 2:
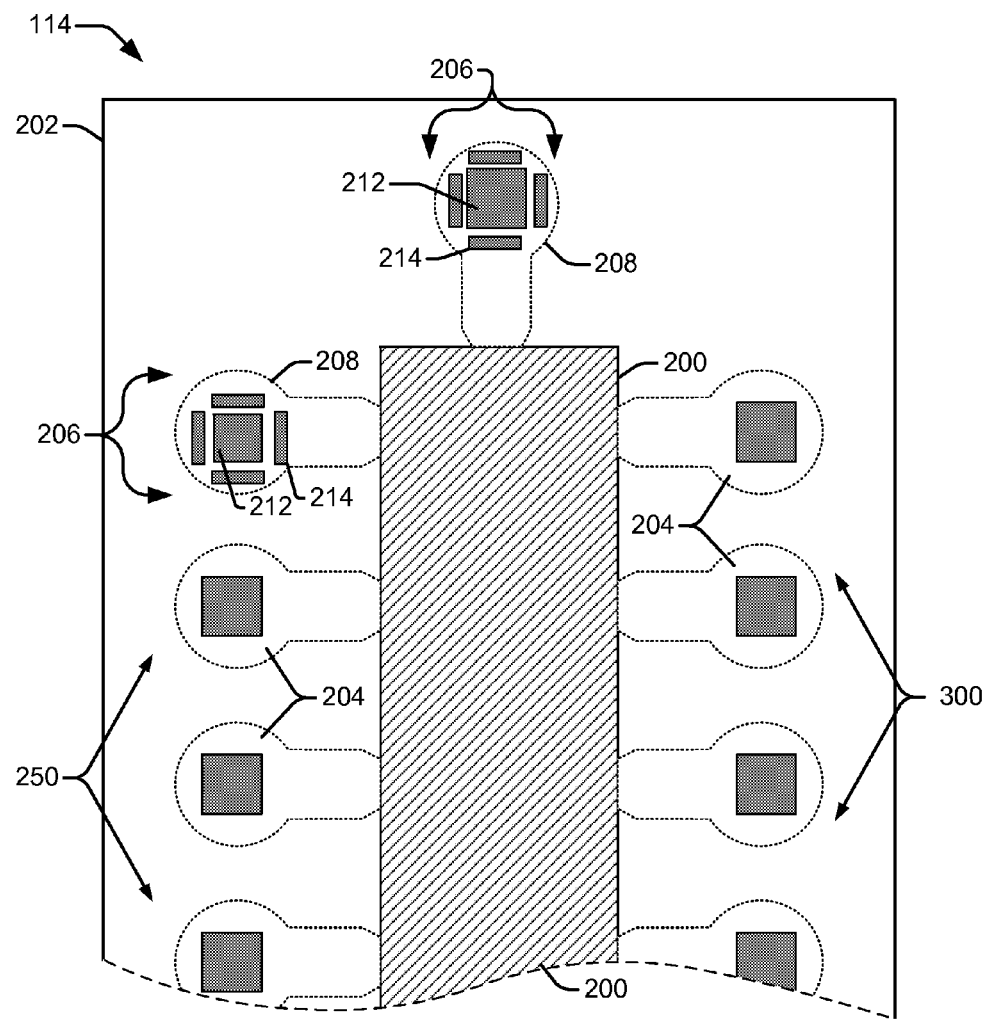
FIG. 2 shows a bottom view of one end of a TIJ printhead having a single fluid slot formed in a silicon die substrate, according to an example implementation.

FIG. 2 shows a bottom view of one end of a TIJ printhead 114 having a single fluid slot 200 formed in a silicon die substrate 202, according to an example implementation. Although printhead 114 is shown with a single fluid slot 200, the principles discussed herein are not limited in their application to a printhead with just one slot 200. Rather, other printhead configurations are also possible, such as printheads with two or more ink slots. In the TIJ printhead 114, substrate 202 underlies a chamber layer having fluid chambers 204 and a nozzle layer having nozzles 116 formed therein. However, for the purpose of illustration, the chamber layer and nozzle layer in FIG. 2 are assumed to be transparent in order to show the underlying substrate 202. Therefore, chambers 204 in FIG. 2 are illustrated using dashed lines. The fluid slot 200 is an elongated slot formed in the substrate 202 that has fluid drop generators 250 arranged along both sides of the slot. The fluid slot 200 is in fluid communication with a fluid supply (not shown), such as a fluid reservoir 120.

In addition to drop generators 250, the TIJ printhead 114 includes one or more printhead-integrated ink level sensors (PILS) 206. An ink level sensor 206 generally includes a sense structure 208 having an ink level sensor circuit 212 integrated on the printhead 114 and a purging resistor circuit 214. However, an ink level sensor 206 additionally incorporates a current source 130 and analog to digital convertor (ADC) 132 from a printer ASIC 126 that is not integrated on the printhead 114. Instead, the printer ASIC 126 is located, for example, on the printer carriage or electronic controller of the printer system 100. The ink level sensor circuit 212 incorporates a sense capacitor (Csense) from within the sense structure 208. The purging resistor circuit 214 can include one or more resistors placed proximate to the ink level sensor circuit 212. For example, the purging resistor circuit 214 can include four resistors surrounding the capacitor of the ink level sensor circuit 212. The purging resistor circuit 214 is used to purge the ink residue from the sense structure 208. The purging resistor circuit 214 works like a normal TIJ resistor that can be addressed by dynamic memory multiplexing (DMUX) and driven by a power FET connected to a fire line. A sense structure 208 and an ink level sensor circuit 212 can be located on the printhead substrate along the ink slot 200 in any position where a typical drop generator 300 is located. The position of the ink level sensors can differ from that shown in FIG. 2, which is merely one example.

Figure 3:
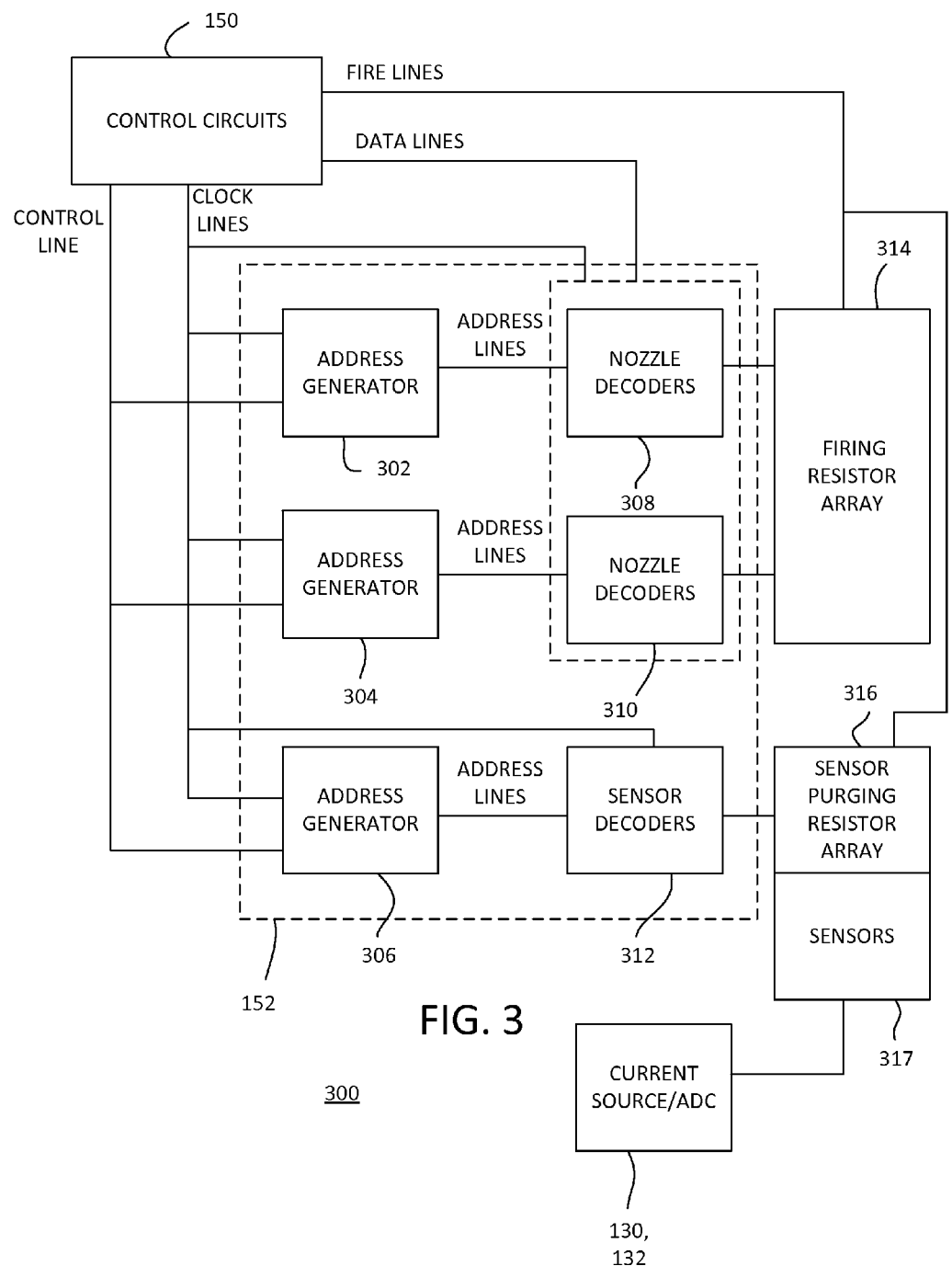
FIG. 3 is a block diagram showing a controller for controlling firing resistors and sensor purging resistors on a printhead according to an example implementation.

FIG. 3 is a block diagram showing a controller 300 for controlling firing resistors and sensor purging resistors on a printhead according to an example implementation. The controller 300 includes the control circuits 150, the control circuits 152, a firing resistor array 314, a sensor purging resistor array 316, sensors 317, and the current source/ADC circuits 130, 132. As noted above, the control circuits 150 and the current source/ADC 130, 132 are part of the ASIC 126 in the electronic controller 110. The control circuits 150 provide a control line, a plurality of clock lines, a plurality of data lines, and a plurality of fire lines. The firing resistor array 314 includes firing resistors for drop ejectors on the printhead (e.g., drop generators 250). The sensor purging resistor array 316 includes purging resistors associated with sensor circuits in the sensors 317 (e.g., firing resistor circuit 214 proximate the sensors 212).

The control circuits 152 are formed on the printhead along with the firing resistor array 314 and the sensor purging resistor array 316. The control circuits 152 include an address generators 302, 304, and 306, nozzle decoders 308 and 310, and sensor decoders 312. The address generator 302 is coupled to the control line and the clock lines and provides output on address lines coupled to the nozzle decoders 308. The address generator 304 is coupled to the control line and the clock lines and provides output on the address lines coupled to the nozzle decoders 310. The address generator 306 is coupled to the control line and the clock lines and provides output on the address lines coupled to the sensor decoders 312. The nozzle decoders 308 and 310 are also coupled to the data lines, the clock lines, and the firing resistor array 314. The sensor decoders 312 are coupled to the clock lines and sensor purging resistor array 316. The sensor purging resistor array 316 is coupled to the current source/ADC 130, 132.

In operation, each of the clock lines can provide periodic pulse signals. The pulses can be arranged such that they occur sequentially in time across the clock lines one after another. The control line can provide pulses in particular patterns over time that line up with the pulses of particular clock lines. The address generators 302, 304, and 306 process the pulses on the control line and the clock lines to produce addresses on the respective address lines. The nozzle decoders 308 and 310 process the addresses, clock pulses on the clock lines, and data on the data lines to switch on particular firing resistors in the firing resistor array 314. Firing pulses on the fire lines are coupled to those resistors in the array 314 that are switched on and ink is ejected from the respective drop ejectors. The sensor decoders 312 process the addresses from the address generator 306 and clock pulses on the clock lines to switch on particular purging resistors in the sensor purging resistor array 316. Firing pulses on the fire lines are coupled to those resistors in the array 316 that are switched on and ink residue can be purged from the respective sensors 317.

The nozzle decoders 308 uses the clock pulses on the clock lines as sequential select signals to enable groups of firing resistors in the firing array 314. The period of the clocks implement time slots in which each select group of firing resistors are switched on/off given in response to the addresses and data on the address and data lines. The number of addressable nozzles on the printhead is equal to the product of the number of fire lines, the number of data lines, and the number of time slots. On some printheads, there can be less nozzles than possible addresses. In such case, the ink level sensors can take the place of nozzles and be assigned an address in the address space. That is, the sensor purging resistor array 316 can effectively be part of the firing resistor array 314 and be controlled by the address generators 302, 304 and the nozzle decoders 308, 310.

On other printheads, however, there is one nozzle for each possible address in the address space (i.e., fire_lines×data_lines×number_of_time_slots). Thus, there is no room for the address generators 302/304 and nozzle decoders 308/310 to control anything other than the firing resistors for the nozzles. Thus, a third address generator 306 and sensor decoders 312 can be provided that are dedicated to the sensor purging resistor array 316. Further, the third address generator 306 is responsive to the same control signal and clock signals used by the address generators 302 and 304. Thus, the control circuits 150 in the ASIC 126 do not need to be changed to accommodate the address generator 306 for the sensor purging resistor array 316. The pulse patterns on the control line can be designed the appropriate addresses are generated for the firing resistors when ejecting ink, and for the sensor firing resistors when purging ink residue. Thus, for printheads and ASICs that provide a particular limited set of resources (e.g., a certain limited number of addresses), nozzles do not need to be removed to incorporate ink level sensors and associated ink purging resistors.

Figure 4:
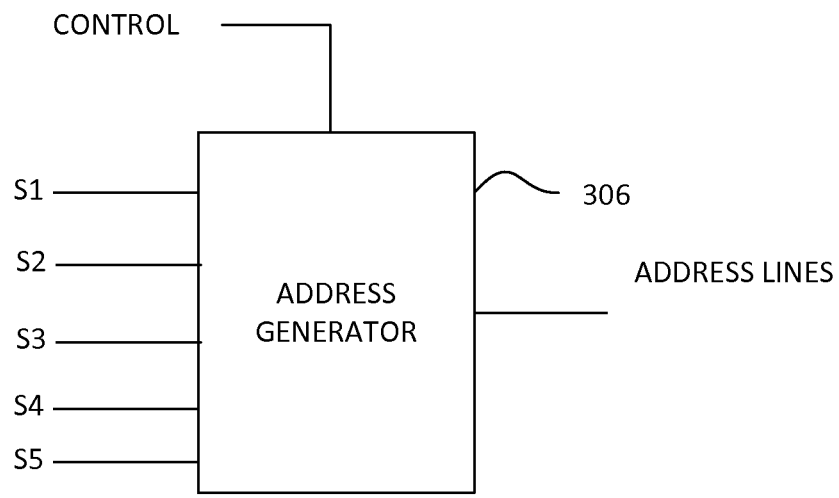
FIG. 4 is a block diagram depicting the address generator for sensor purging resistors according to an example implementation.

FIG. 4 is a block diagram depicting the address generator 306 for sensor purging resistors according to an example implementation. In an example, the address generator 306 includes five inputs for processing five of the clock lines (referred to as S1 through S5), and an input for processing a control signal on the control line. In other examples, the address generator 306 can include any number of clock line inputs to correlate with the number of clock lines present on the printhead. The address generator 306 produces an N-bit address on address lines. Depending on design, the address generator 306 produces a desired number of addresses. For example, for a design having two PILS modules, the address generator produces a 1-bit address on the address lines. For designs having more PILS modules, the address generator 306 can have more address lines for producing multi-bit addresses.

Figure 5:
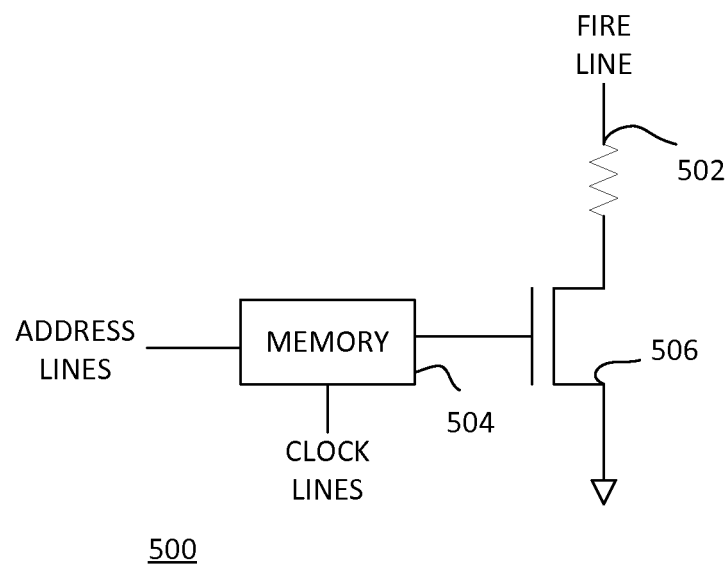
FIG. 5 is a block diagram depicting a decoder in the sensor decoders according to an example implementation.

FIG. 5 is a block diagram depicting a decoder 500 in the sensor decoders 312 according to an example implementation. The decoder 500 includes a memory 504 and a field effect transistor (FET) 506. The FET 506 acts as a switch to conduct current on the firing line through a purging resistor 502 (or purging resistor network) controlled by the memory 504. The memory 504 is responsive to the address lines and the clock lines to selectively enable/disable the FET switch 506. When the FET switch 506 is switched on, current is conducted through the purging resistor 502 to clear ink residue in the associated sensor chamber.

Figure 6:
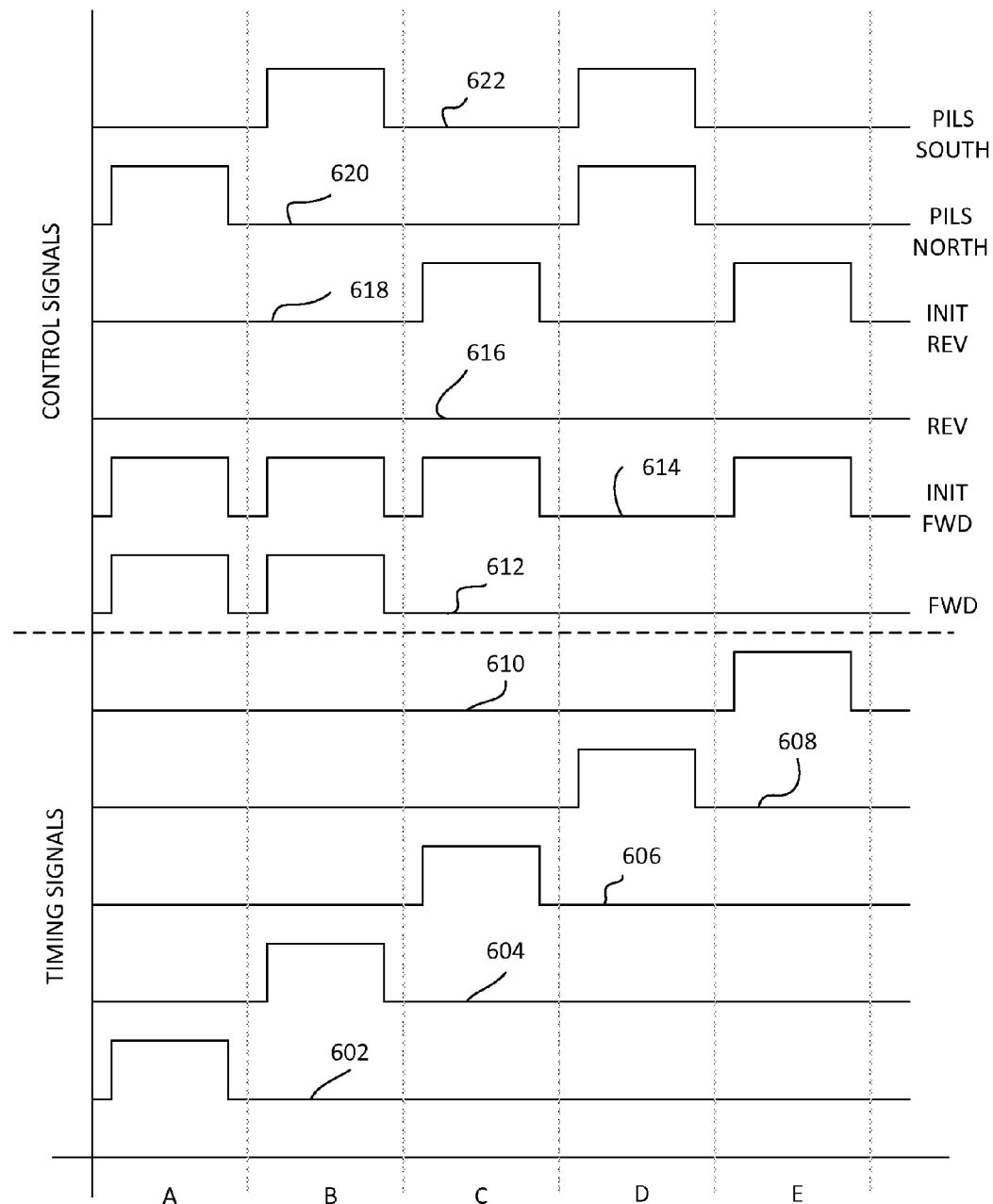
FIG. 6 is a graph illustrating example control signals for instructing the address generator of FIG. 4 according to an example implementation.

FIG. 6 depicts an example graph illustrating a series of five timing signals 602 through 610 each including a pulse at a different point in time than the other timing signals. Thus, the timing signals 602 through 610 provide a series of five pulses. FIG. 6 also depicts six different control signals 612 through 622 that may be supplied to the address generators 302-306 described above. Each control signal includes zero to five pulses each timed to coincide with a pulse of a particular timing signal 602-610. In the example of FIG. 6, signals 602-610 span time periods A-E, where signal 602 has a pulse in time slot A, signal 604 has a pulse in time slot B, and so on until signal 610 has a pulse in time slot E.

When ejecting ink to form a desired image on a sheet of paper or other media, a fluid ejecting device such as an ink cartridge may be moved back and forth along on a first axis across the media while the media is moved along a second axis orthogonal to the first. In one example, control signals 612 and 614 are utilized when the fluid ejecting device is moved in one direction along the first axis (e.g., a forward direction). Control signals 616 and 618 are utilized when the fluid ejecting device is moved in the other direction along the first axis (e.g., a reverse direction). Control signals 612 through 618 are identified by the address generators 302 and 304 and cause the address generators 302 and 304 to generate addresses identified by the nozzle decoders 308 and 310 for switching firing resistors and ejecting ink. Control signals 620 and 622 are identified by the address generator 306 and cause the address generator 306 to generate addresses identified by the sensor decoders 312 for switching the sensor purging resistors and purging ink residue from the sensor chambers. The address generators 302 and 304 are configured to not produce addresses in response to the control signals 620 and 622 so as to not cause ink to be ejected. Likewise, the address generator 306 is configured to not produce addresses in response to the control signals 612 through 618 so as to not activate sensor purging resistors when ink is to be ejected.

Figure 7:
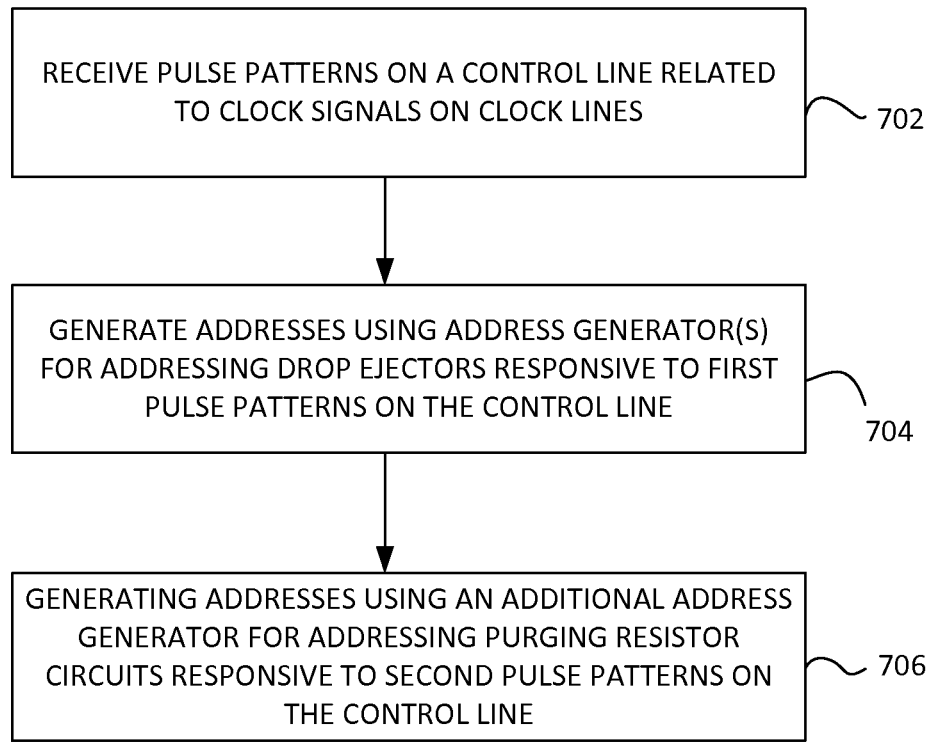
FIG. 7 is a flow diagram depicting a method of controlling a printhead according to an example implementation.

FIG. 7 is a flow diagram depicting a method 700 of controlling a printhead according to an example implementation. The method 700 begins at step 702, where pulse patterns are received on a control line related to clock signals on clock lines. At step 704, addresses are generated using at least one address generator for addressing drop ejectors responsive to first pulse patterns on the control line (e.g., the pulse patterns 612 through 618). At step 706, addresses are generated using another address generator for addressing sensor purging resistors responsive to second pulse patterns on the control line (e.g., the pulse patterns 620 and 622).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A printhead, comprising:
   drop ejectors fluidically coupled to nozzles;
   at least one nozzle address generator;
   nozzle decoders coupled to the at least one nozzle address generator and the drop ejectors;
   ink level sensors each having a sensor circuit in a sensor chamber and a purging resistor circuit
   a sensor address generator; and
   sensor decoders coupled to the sensor address generator and the purging resistor circuit in each of the ink level sensors.

2. The printhead of claim 1, wherein the at least one nozzle address generator and the sensor address generator are coupled to a control line and a plurality of clock lines.

3. The printhead of claim 2, wherein the at least one nozzle address generator is responsive to first pulse patterns on the control line, and wherein the sensor address generator is responsive to second pulse patterns on the control line.

4. The printhead of claim 3, wherein the second pulse patterns includes a pulse pattern causing the sensor address generator to address a first portion of the sensor decoders, and a second pulse pattern causing the sensor address generator to address a second portion of the sensor decoders.

5. The printhead of claim 1, wherein the at least one nozzle address generator generates addresses in an address space equal to a number of the drop ejectors.

6. A method of controlling a printhead, comprising:
receiving pulse patterns on a control line related to clock signals on clock lines;
generating addresses using at least one address generator for addressing drop ejectors responsive to first pulse patterns on the control line; and
generating addresses using an additional address generator for addressing purging resistor circuits for ink level sensors responsive to second pulse patterns on the control line.

7. The method of claim 6, wherein the at least one address generator generates addresses in an address space equal to a number of the drop ejectors.

8. The method of claim 7, wherein the number of drop ejectors and a number of purging resistor circuits exceed the number of addresses in the address space.

9. An apparatus, comprising:
a firing resistor array having resistors to thermally eject ink from nozzles;
a sensor purging resistor array having purging resistor circuits for purging ink residue from ink level sensors;
nozzle decoders to selectively couple energy on fire lines to the resistors;
sensor decoders to selectively couple energy on the fire lines to the purging resistor circuits;
at least one address generator to provide address signals to the nozzle decoders; and
an additional address generator to provide address signals to the sensor decoders.

10. The apparatus of claim 9, further comprising:
clock lines to provide clock signals to the at least one address generator and the additional address generator; and
a control line to provide pulse patterns related to the clock signals on clock lines, the pulse patterns having first pulse patterns detectable by the at least one address generator and second pulse patterns detectable by the additional address generator.

* * * * *